Figure 1:
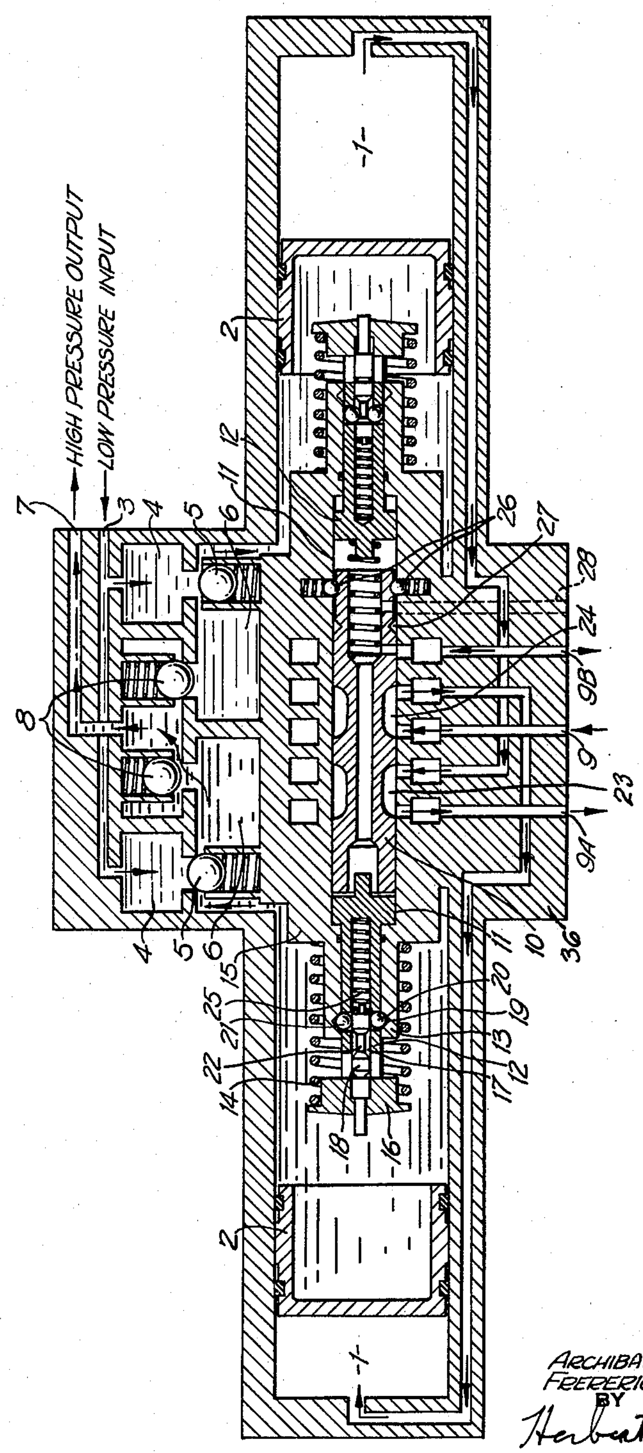

Feb. 23, 1960 A. W. SHARPE ET AL 2,925,782

LIQUID PUMP

Filed Jan. 7, 1954 2 Sheets-Sheet 1

INVENTORS
ARCHIBALD W. SHARPE
FREDERICK ERRINGTON
BY Herbert H. Thompson
ATTORNEY Feb. 23, 1960 A. W. SHARPE ET AL 2,925,782

LIQUID PUMP

Filed Jan. 7, 1954 2 Sheets-Sheet 2

INVENTORS
ARCHIBALD W. SHARPE
FREDERICK ERRINGTON
BY
Herbert H. Thompson
ATTORNEY United States Patent Office 2,925,782

Patented Feb. 23, 1960

2,925,782

LIQUID PUMP

Archibald Walter Sharpe, West Wimbledon, London, and Frederick Errington, London, England, assignors to The Sperry Gyroscope Company Limited, Brentford, England, a company of Great Britain Application January 7, 1954, Serial No. 402,678

Claims priority, application Great Britain February 17, 1953

7 Claims. (Cl. 103—52)

This invention is for a novel form of liquid pump. Most known pumps fall into one of two general classes; rotary pumps in which a rotor is driven by mechanical means and liquid, which is fed into the pump between a rotor and a stator, is raised to high pressure by centrifugal action; and reciprocating pumps in which a piston is driven mechanically to move in a cylinder and alternately allow low-pressure liquid to be introduced into the cylinder and raise the liquid to high pressure. Pumps in each of these classes require a motor or other driving means and require to run continuously if high pressure fluid is to be always available to meet an intermittent demand.

According to the present invention there is provided a liquid pump including a cylinder, a free piston movable therein and forming a space for liquid on one side and a space for gas on the other side of the piston and means for supplying liquid from the liquid space at substantially the pressure of a gas supplied to the gas space.

The invention further consists in a liquid pump comprising in association with the liquid space an inlet duct for low pressure liquid and an outlet duct for high pressure liquid, a non-return valve normally closed in each duct and means operable by the piston alternately to supply gas under pressure to the gas space, or to permit the escape of gas therefrom.

Liquid can be introduced into the cylinder through a valve when the gas pressure is not applied to the other side of the piston so that when the gas pressure acts on the other side of the piston, the pressure of the liquid will be raised to the pressure of the gas. The high pressure of the liquid will be sufficient to maintain the inlet valve closed and the liquid can be supplied when it is required by opening a normally-closed high pressure outlet valve. It can be arranged that when the piston is at, or near, the end of its stroke, a switch is tripped to cause the gas end of the cylinder to be connected to exhaust instead of the the source of high pressure gas. Any liquid that is left in the cylinder will drop in pressure when the gas pressure is removed, and the cylinder will be refilled with low pressure liquid from an accumulator at low pressure through the inlet valve, it being arranged that the pressure of the low pressure liquid is greater than the exhaust pressure. As the cylinder fills and the piston reaches, or nears, the end of its induction stroke, it can be arranged to trip a second switch for connecting the gas end of the cylinder to the source of gas pressure instead of to exhaust so that the liquid will again be raised to high pressure.

In order that there need not be a cessation in supply of high pressure liquid while the cylinder is refilling, the pump may be provided with a second cylinder so that one can be filled while the other is supplying high pressure liquid. When one cylinder is empty its position can be arranged to trip a switch which will cause the liquid in the other cylinder to be raised to high pressure while the one cylinder is refilled.

If a steady high pressure supply is required during the change-over from one cylinder to the other, a high pressure accumulator can be provided, into which both cylinders discharge in turn, and from which high pressure liquid is supplied.

The system may be closed and include a low pressure liquid accumulator from which the cylinders are filled. This has the advantage that leakage from the system can be counteracted by making the accumulator large and in the form of a cylinder with a piston so that its size can be modified as leakage occurs.

It will be seen that a liquid pump, according to the invention, requires no driving motor, but may be operated by a continuous gas supply which can be provided, for example, by burning a charge of cordite in a combustion chamber. This will be very advantageous in applications where space is limited and where it is required that the weight of the pump be small. There is also the advantage that an assembly of a pump and a gas supply system requires no external connections.

Figure 2:
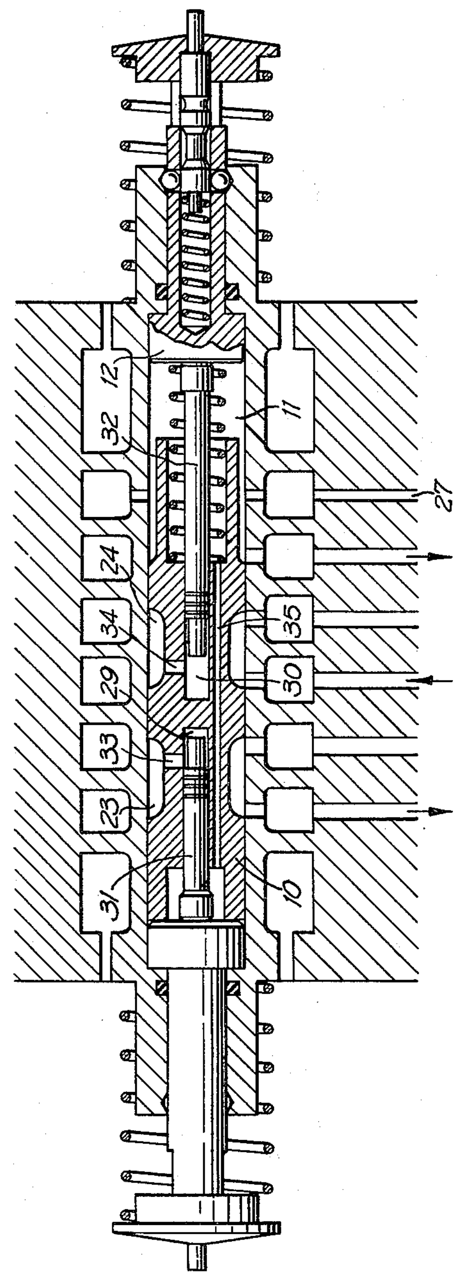

Further features of the invention are shown in the embodiments illustrated in the accompanying drawings, in which:

Fig. 1 is a diagram of a preferred embodiment of the invention consisting of a two-cylinder pump, and Fig. 2 shows, to a somewhat larger scale, an alternative form that a detail of the embodiment shown in Figure 1 may take.

Referring to Figure 1 of the drawings, a liquid pump has two cylinders 1 joined co-axially by a fixed or body member 36 of a sliding valve device. In each of the two cylinders 1 is slidable a piston 2. The pistons 2 are free, that is to say, they are not associated with connecting rods but can be moved along the cylinders if there is a difference in pressure across their faces. Low pressure liquid is to be introduced into the cylinders 1 at the inner sides of the pistons 2 as shown in the drawing, and high pressure gas is to be introduced into the cylinders at the outer sides of the pistons 2 as shown in the drawing.

The low pressure liquid is provided from an accumulator not shown by way of a channel 3 into reservoirs 4 which are in communication with the liquid ends of the cylinder 1 through normally-closed ball valves 5. The pressure of the low pressure liquid is sufficient to open the ball valves 5 against their retaining springs provided that high pressure liquid is not present in reservoirs 6 which are in direct communication with the liquid end of the cylinder 1. The reservoirs 6 communicate with an outlet channel 7 for high pressure liquid through normally-closed ball valves 8. The ball valves 8 will be retained in the closed position unless high pressure liquid is present in the reservoirs 6.

High pressure gas is supplied from a source, not shown, through a channel 9 to one or other of the cylinders 1 according as a shuttle valve 10 is in one of two positions. In Figure 1, the shuttle valve 10 is shown as being in the position in which the channel 9 is in communication with the left hand cylinder 1. The shuttle valve 10 is arranged so that when the channel 9 is in communication with the gas end of one of the cylinders 1, then the gas end of the other of the cylinders 1 is in communication with an exhaust channel 9A or 9B.

As shown in Figure 1, high pressure gas is present in the gas end of left hand cylinder 1 so that the piston 2 in that cylinder is urged inwardly to raise the pressure of the liquid in that cylinder to high pressure sufficient to maintain the left hand ball valve 5 closed (so that the low pressure in the inlet channel 3 is not in communication with the left hand reservoir 6) and to hold the left hand ball valve 8 open (so that the left hand reservoir 6 is in communication with the high pressure outlet channel 7) as high pressure liquid is used by a utilisation device, for example, a hydraulic servo motor (not shown). The piston 2 is moved further inwards along the left hand cylinder 1 by the high pressure gas in the gas end of that cylinder to maintain the liquid in the liquid end of that cylinder at high pressure.

While high pressure liquid is being supplied from the left hand cylinder 1, the gas end of the right hand cylinder 1 is connected to the exhaust channel 9A. It is arranged that the pressure in the low pressure liquid accumulator is greater than the exhaust pressure of channel 9A.

Since there is no high pressure gas in the gas end of the right hand cylinder 1, the pressure in the liquid end of that cylinder will not be high, so that low pressure fluid in the right hand reservoir 4 can hold open the right hand ball valve 5 to cause the low pressure liquid to enter the liquid end of the right hand cylinder 1. Since the pressure of the liquid is greater than the pressure in the gas end of the cylinder, the liquid will push the right hand piston 2 along the cylinder to the outer end while more liquid will enter the cylinder from the right hand reservoir 4 and through the right hand ball valve 5 until the cylinder is filled with liquid. The right hand cylinder will then be charged so that when the left hand cylinder 1 is exhausted, high pressure liquid can be supplied from the right hand cylinder 1 by supplying the gas end with high pressure gas.

Thus, a substantially continuous supply of high pressure liquid can be achieved, one cylinder supplying liquid at high pressure while the other is filling with liquid at low pressure. It is desirable that the demand on the pump should not be so great that one cylinder empties before the other is filled with low pressure liquid.

There will now be described the arrangement for switching the pump automatically so that when the cylinder which has been supplying high pressure liquid is exhausted, the high pressure gas will be supplied to the gas end of the other cylinder. As described above, the gas pressure is supplied through channel 9 to one or other of the cylinders 1 according as the shuttle valve 10 is in one or the other of two positions respectively at the left and at the right of its cylinder 11.

In Figure 1, the shuttle valve 10 is shown at the left end of its cylinder 11, so that it is the left hand cylinder 1 which is supplying high pressure liquid while it is the right hand cylinder 1 which is being re-charged with low pressure liquid. The shuttle valve 10 is arranged to be moved along its cylinder 11 by a pusher member 12 which is slidable within a block 13 against the restraining force of a spring 14 positioned between shoulders 15 on the block 13 and a cap 16 on the pusher member 12. The pusher member 12 is arranged so that a pressure on its end equal to the high pressure to which the liquid is to be raised is sufficient to push it, and hence the shuttle valve 10, along the cylinder 11 until the shuttle valve 10 takes up its other position at the right end (or the left end).

Within the pusher member 12 is a bore 17 within which is slidable a cam 18. In recesses 19 in the wall of the pusher member 12, are placed balls 20 which can take up a position beyond the diameter of the pusher member 12 or within the diameter of the pusher member 12. A groove 21 is provided in the block 13 in which the balls 20 can locate when they project beyond the diameter of the pusher member 12. By virtue of a portion 22 of the cam 18 which is of reduced diameter, the cam 18 can be positioned along the bore 17 either as shown in Figure 1 in a position holding the balls 20 out into the groove 21 to prevent movement of the pusher member 12 along the block 13, or in a position as shown in the arrangement at the right end of Figure 1 in which the balls 20 can take up their position within the diameter of pusher member 12. The arrangement is such that as long as the cam 18 is in the position shown at the left end of Figure 1 with respect to the balls 20, the pusher member 12 will not be able to be moved along the block 13 whereas if the cam 18 is displaced inwardly to a position in which the balls 20 are aligned with the portion 22 of restricted diameter of the cam 18, the pusher member 12 can be slid along the block 13 if there is a sufficient force on its end to bring the balls 20 out of the recess 19 and to overcome the restraining force of the spring 14.

When the left hand cylinder 1, which has been supplying high pressure liquid, is nearly exhausted, the piston 2 will come into contact with the end of the cam 18 and further inward movement of the piston 2 will move the cam 18 along the pusher member 12 until the portion 22 of reduced diameter is aligned with the balls 20. The high pressure liquid in the cylinder acting on the area of the pusher member 12 will be sufficient to urge the balls 20 out of the recess 19 and into the space provided by the portion 22 of reduced diameter, so that the pusher member 12 will be forced inwards by the high pressure fluid and will move the shuttle valve 10 along the cylinder 11 to its other position at the right hand end of the cylinder 11.

This movement of the shuttle valve 10 will put the gas end of the right hand cylinder 1 into communication with the channel 9 by way of the passage 23, and will put the gas end of the left hand cylinder 1 into communication with the exhaust channel 9B by way of the passage 24 so that delivery of high pressure liquid will be from the right hand cylinder.

The spring 25 will re-set the cam 18 and the pusher member 12 will be pushed out again by the spring 14 as soon as the pressure of the liquid in the left hand cylinder falls, due to its gas end being connected to exhaust. In Figure 1, the trip mechanism at the right hand end of the pump is shown in the position in which the pusher member 12 and the cam 18 are moving back into the positions shown in the trip mechanism at the left hand end of Figure 1.

There is also provided a mechanism for maintaining the shuttle valve 10 in whichever of its two positions it is placed, so that external forces acting on the pump will not cause the shuttle valve 10 to be moved out of its set position. As shown in Figure 1, this mechanism consists of spring-located balls 26 in the block 13 arranged to locate in grooves 27 in the shuttle valve 10. The balls 26 locate in one or the other of the grooves 27 according to which of its positions the shuttle valve 10 takes up. The force of the high pressure liquid, which is used to move the shuttle valve 10 from one position to the other, when it is desired to switch from one cylinder to the other, is sufficient to urge the balls 26 out of the grooves 27 to allow movement of the shuttle valve 10 to occur. A vent 28 to atmosphere is provided so that gas pressure cannot build up in either end of the cylinder 11.

In Figure 2, there is shown another way of maintaining the shuttle valve 10 in one or the other of its two positions. The shuttle valve 10 is provided with two internal cylinders 29 and 30, one bored in each end of the shuttle valve 10. In these cylinders are positioned pistons 31 and 32 which can co-operate with the pusher members 12. The inner ends of the cylinders 29 and 30 are connected by channels 33 and 34 to passages 23 and 24 respectively, so that the position shown in Figure 2, in which the shuttle valve 10 is at the left hand end of the cylinder 11, the cylinder 29 is connected to exhaust by way of exhaust channel 9A, and the cylinder 30 is connected to a source of high pressure gas by way of channel 9. The high pressure gas acting on the end of piston 32 acts to prevent movement of the shuttle valve 10 along the cylinder 11 due to external forces.

The area of the cylinders 29 and 30 is less than that of the pusher members 12 so that this restraining force can be overcome by the force due to the high pressure liquid when it is necessary to switch over from supplying high pressure liquid from one cylinder 1 to the other cylinder 1. When the changeover occurs, cylinder 29 will be connected to the source of high pressure gas by way of passage 23 and the cylinder 30 will be connected to exhaust by way of passage 24. A vent 35 is used in conjunction with vent 27 to cause the ends of the shuttle valve 10 in Figure 2 to be at the same pressure.

This arrangement for maintaining the position of the shuttle valve 10 is preferable to the arrangement shown in Figure 1 as there is less wear on moving parts and in particular as there are no springs and balls to wear.

Although the embodiment of the invention has been described with reference to a low pressure liquid accumulator, only a small accumulator is necessary when the pump is used in a closed circuit, because the cylinder 1 that is being filled can act in effect as the low pressure liquid accumulator. As liquid is supplied from one of the cylinders 1, liquid is also being supplied to the other of the cylinders 1 so that a large external accumulator is not necessary. There is merely required a space in which can be stored liquid due to any difference between the rate of supply from one cylinder and the rate of filling of the other cylinder and in which can also be stored sufficient excess liquid to make up for losses due to leakage.

Although the two-cylinder pump described with reference to Figure 1 has a substantially constant output of high pressure liquid, there will be a short period during the changeover from supplying from one cylinder to supplying from the other cylinder during which only a slightly reduced high pressure liquid is available. If such an interruption in the output cannot be permitted, there may be provided a small high pressure liquid accumulator into which both cylinders can be arranged to supply high pressure liquid, and from which high pressure liquid can be withdrawn when required, even during the changeover period.

What we claim is:

1. A gas-motivated fluid pump for raising the pressure of fluid supplied to said pump to an increased outlet ressure, said pump comprising a cylinder, a free piston element freely slidable in said cylinder and cooperating therewith to define a fluid chamber on one side of said piston element and a gas chamber on the other side of said element, a fluid supply conduit, a fluid outlet conduit, first valve means for connecting one of said outlet conduit and said fluid supply conduit in communication with said fluid chamber according, respectively, to whether or not said fluid chamber pressure exceeds a preselected value, a gas pressure supply conduit, an exhaust conduit, second valve means within said pump operable to connect one of said gas pressure supply conduit and said exhaust conduit in communication with said gas chamber, pressure-responsive means within said cylinder arranged to be subjected to fluid chamber pressure for operating said second valve means, said pressure responsive means being responsive to fluid chamber pressures exceeding said preselected value to operate said second valve means to connect said exhaust conduit in communication with said gas chamber and being responsive to other fluid chamber pressures to operate said second valve means to connect said gas pressure supply conduit in communication with said gas chamber, and means for preventing said pressure responsive means from operating said second valve means in response to pressure in excess of said preselected value until said piston element has slid a given distance in said cylinder in a direction to expel fluid therefrom via said first valve means and said outlet conduit.

2. A gas-motivated fluid pump for raising the pressure of fluid supplied to said pump to an increased outlet pressure, said pump comprising a cylinder, a free piston element freely slidable in said cylinder and cooperating therewith to define a fluid chamber on one side of said piston element and a gas chamber on the other side of said element, a fluid supply conduit, a fluid outlet conduit, first valve means for connecting one of said outlet conduit and said fluid supply conduit in communication with said fluid chamber according, respectively, to whether or not said fluid chamber pressure exceeds a preselected value, a gas pressure supply conduit, an exhaust conduit, second valve means within said pump operable to connect one of said gas pressure supply conduit and said exhaust conduit in communication with said gas chamber, pressure-responsive means within said pump arranged to be subjected to fluid chamber pressure for operating said second valve means, said pressure-responsive means being responsive to fluid chamber pressures exceeding said preselected value to operate said second valve means to connect said exhaust conduit in communication with said gas chamber and being responsive to other fluid chamber pressures to operate said second valve means to connect said gas pressure supply conduit in communication with said gas chamber, said pressure-responsive means comprising a second piston element having a head portion extending into the fluid chamber and a stem portion of lesser cross-sectional area than said head portion, said stem portion having a distal end exposed to exhaust pressure, means for supporting said second piston element for limited movement in the longitudinal direction of said stem portion, said supporting means being arranged to isolate said distal end of said stem portion from said fluid chamber, resilient means for urging said head portion to move in a direction tending to increase its extension into said fluid chamber, and means for preventing said pressure-responsive means from operating said second valve means in response to pressure in excess of said preselected value until said piston element has slid a given distance in said cylinder in a direction to expel fluid therefrom via said first valve means and said outlet conduit.

3. A gas-motivated fluid pump for raising the pressure of fluid supplied to said pump to an increased outlet pressure, said pump comprising a cylinder, a free piston element freely slidable in said cylinder and cooperating therewith to define a fluid chamber on one side of said piston element and a gas chamber on the other side of said element, a fluid supply conduit, a fluid outlet conduit, first valve means for connecting one of said outlet conduit and said fluid supply conduit in communication with said fluid chamber according, respectively, to whether or not said fluid chamber pressure exceeds a preselected value, a gas pressure supply conduit, an exhaust conduit, second valve means within said pump operable to connect one of said gas pressure supply conduit and said exhaust conduit in communication with said gas chamber, pressure-responsive means within said pump arranged to be subjected to fluid chamber pressure for operating said second valve means, said pressure-responsive means being responsive to fluid chamber pressures exceeding said preselected value to operate said second valve means to connect said exhaust conduit in communication with said gas chamber and being responsive to other fluid chamber pressures to operate said second valve means to connect said gas pressure supply conduit in communication with said gas chamber, said pressure-responsive means comprising a second piston element having a head portion extending into the fluid chamber and a stem portion of lesser cross-sectional area than said head portion, said stem portion having a distal end exposed to exhaust pressure, means for supporting said second piston element for limited movement in the longitudinal direction of said stem portion, said supporting means being arranged to isolate said distal end of said stem portion from said fluid chamber, resilient means for urging said head portion to move in a direction tending to increase its extension into said fluid chamber, means for preventing said pressure-responsive means from operating said second valve means in response to pressure in excess of said preselected value until said piston element has slid a given distance in said cylinder in a direction to expel fluid therefrom via said first valve means and said outlet conduit, said supporting means being provided with a groove and said means for preventing the pressure-responsive means from operating the second valve means until the first piston element has slid a given distance in the cylinder comprises a ball device normally engaging said groove so as to prevent movement of the stem portion of the second piston element relative to the supporting means, and a spring-loaded cam coaxial with said stem portion for disengaging said ball device from said groove upon movement of said cam, said cam having a portion projecting into the fluid chamber arranged to be physically contacted and moved by the first piston element when the latter has slid said given distance.

4. In a gas-motivated fluid pump, a body portion, a pair of cylinders projecting from opposite sides of said body portion, a freely slidable piston element in each of said cylinders, said pistons cooperating with said cylinders to define fluid chambers on the side of each piston element proximal to said body portion and to define gas chambers on the other side of each piston element, a fluid supply conduit, a fluid outlet conduit, first valve means for connecting one of said outlet conduit and said fluid supply conduit in communication with said fluid chambers according, respectively, to whether or not the pressure in said fluid chambers exceeds a preselected value, a gas pressure supply conduit, a first exhaust conduit, a second exhaust conduit, second valve means operable in one sense to connect said gas pressure supply conduit in communication with a first of said gas chambers and simultaneously to connect said first exhaust conduit in communication with the second of said gas chambers, said second valve means being operable in a second sense to connect said gas pressure supply conduit in communication with said second gas chamber while simultaneously connecting said second exhaust conduit in communication with said first gas chamber, first pressure responsive means arranged to be subjected to pressure in the fluid chamber of the cylinder containing said first gas chamber, said first pressure responsive means being responsive to a fluid chamber pressure exceeding said preselected value to operate said second valve means in said second sense and being responsive to other fluid chamber pressures to operate said second valve means in said first sense, second pressure reponsive means arranged to be subjected to pressure in the fluid chamber in the cylinder containing said second gas chamber, said second pressure responsive means being responsive to a fluid chamber pressure exceeding said preselected value to operate said second valve means in said first sense and being responsive to other fluid chamber pressures to operate said second valve in said second sense, means for preventing said first pressure-responsive means from operating said second valve means in response to a pressure in excess of said preselected value until the piston element in the cylinder containing said first gas chamber has slid a given distance toward said body portion, and means for preventing said second pressure responsive means from operating said second valve means in response to a pressure in excess of said preselected value until the piston element in the other cylinder has slid said given distance toward said body portion.

5. The fluid pump of claim 4 further including means associated with said second valve means for rendering the same insensitive to forces external of said pump.

6. A fluid pump comprising two cylinders joined coaxially by a fixed member of a sliding valve device, a free piston slidable in each cylinder, a space for liquids on the inner side and a space for gas on the outer side of each piston, means for supplying high pressure gas and exhausting low pressure gas, a sliding valve device positionably disposed between said pistons having pressure-responsive portions extending into the liquid space of each cylinder, said sliding valve device being operated selectively by the pressure of the liquid when the piston in one cylinder is at or near the end of its inward travel for admitting gas under pressure to the gas space of the other cylinder and exhausting gas from the first mentioned cylinder, and means for selectively supplying low pressure liquid to and high pressure liquid from the liquid spaces whereby high pressure liquid from the liquid spaces is supplied at substantially the pressure of gas supplied to the gas space.

7. The fluid pump of claim 6 wherein the sliding valve device is coaxially disposed between said pistons, said sliding valve device including resilient means and locking means, said sliding valve device having a separate coaxial extension at each end urged outwardly by said resilient means and held from axial movement by said locking means releasable by either one of said pistons nearing the inner end of its travel whereby positioning the sliding valve device selectively applies high pressure gas to one of the gas spaces and exahusts the gas from the other gas space.

References Cited in the file of this patent

UNITED STATES PATENTS

| | | |
|---|---|---|
| 870,685 | Prott | Nov. 12, 1907 |
| 1,849,060 | Dodson | Mar. 15, 1932 |
| 2,186,968 | Grau | Jan. 16, 1940 |
| 2,239,715 | Hollander et al. | Apr. 29, 1941 |
| 2,604,310 | Brown | July 22, 1952 |
| 2,699,152 | Russell | Jan. 11, 1955 |